United States Patent
Shibutani et al.

(10) Patent No.: US 8,803,099 B2
(45) Date of Patent: Aug. 12, 2014

(54) COMPOUND, SCINTILLATOR, AND RADIATION DETECTOR

(71) Applicant: Canon Kabushiki Kaisha, Tokyo (JP)

(72) Inventors: Yoshinori Shibutani, Tokyo (JP); Ryoko Ueyama, Kawasaki (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/909,454

(22) Filed: Jun. 4, 2013

(65) Prior Publication Data

US 2013/0327945 A1 Dec. 12, 2013

(30) Foreign Application Priority Data

Jun. 6, 2012 (JP) ................. 2012-128997

(51) Int. Cl.
*G01T 1/10* (2006.01)
*G01T 3/06* (2006.01)

(52) U.S. Cl.
CPC ....................... *G01T 3/06* (2013.01)
USPC ..................................... 250/361 R

(58) Field of Classification Search
CPC ....................................... G01T 3/06
USPC ..................................... 250/361 R
See application file for complete search history.

(56) References Cited

U.S. PATENT DOCUMENTS

| | | | |
|---|---|---|---|
| 6,278,832 B1 * | 8/2001 | Zagumennyi et al. | 385/141 |
| 7,091,501 B2 * | 8/2006 | Joly et al. | 250/484.4 |
| 7,525,094 B2 * | 4/2009 | Cooke et al. | 250/361 R |
| 8,067,642 B2 * | 11/2011 | Cumming et al. | 568/17 |
| 8,440,983 B2 * | 5/2013 | Yanagita et al. | 250/458.1 |
| 8,486,300 B2 * | 7/2013 | Gundiah et al. | 252/301.4 H |
| 8,519,347 B2 * | 8/2013 | Kanatzidis et al. | 250/370.09 |

FOREIGN PATENT DOCUMENTS

JP 2003-147343 A 5/2003

* cited by examiner

*Primary Examiner* — Kiho Kim
(74) *Attorney, Agent, or Firm* — Canon U.S.A., Inc., IP Division

(57) ABSTRACT

There is provided a compound represented by the general formula $Cs_3Cu_2[I_{1-x}Cl_x]_5$, wherein x is 0.71 or more and 0.79 or less. Also, there is provided a method for producing a compound, comprising mixing cesium iodide, cesium chloride, and copper chloride together in such a manner that the molar ratio of cesium to copper to iodine to chlorine is 3:2:5(1-x):5x (wherein $0.71 \leq x \leq 0.79$), melting the resulting mixture, and solidifying the resulting molten material to give a compound.

12 Claims, 3 Drawing Sheets

COMPOUND, SCINTILLATOR, AND RADIATION DETECTOR

BACKGROUND OF THE INVENTION

1. Field of the Invention

The present invention relates to a compound, a scintillator, and a radiation detector.

2. Description of the Related Art

Radiation detectors used for radiodiagnosis are configured to detect applied radiation in order to acquire radiographs as digital signals. The radiation detectors are broadly divided into direct radiation detectors and indirect radiation detectors. An indirect radiation detector is a detector that acquires an image by changing radiation into visible light with a scintillator composed of a phosphor, allowing the visible light to be received on a photoelectric conversion element, for example, a photodiode composed of amorphous silicon (a-Si), a photodiode composed of single-crystal silicon (c-Si), or a charge-coupled device (CCD), and converting the visible light into a charge signal.

In the case where a-Si is used as a photoelectric conversion element for an indirect radiation detector, a-Si has sensitivity in a wavelength band of 450 nm to 650 nm; hence, a scintillator is required to exhibit light emission in a wavelength band of about 450 nm to about 650 nm. In the case where c-Si is used as a photoelectric conversion element, c-Si has sensitivity in the region of longer wavelengths than a-Si, i.e., in the region of about 500 nm to about 900 nm; hence, a scintillator is required to exhibit light emission in a wavelength region corresponding to the region.

Japanese Patent Laid-Open No. 2003-147343 discloses a scintillator composed of a mixed crystal of cesium iodide and copper iodide. The patent document states that the mixed crystal contains a $Cs_3Cu_2I_5$ compound and exhibits light emission at a wavelength of about 440 nm. Unfortunately, the emission wavelength range of the mixed crystal described in the patent document differs from a wavelength band suitable for the sensitivity characteristics of a photoelectric conversion element (a-Si or c-Si). Thus, the intensity when light emitted from the mixed crystal is received on the photoelectric conversion element (the intensity of light received) is not sufficient. Accordingly, aspects of the present invention provide a novel compound in which when light emitted from the compound is received on a photoelectric conversion element, the intensity of the light received is higher than those of the related art.

SUMMARY OF THE INVENTION

One disclosed aspect of the present invention provides a compound represented by the general formula $Cs_3Cu_2[I_{1-x}Cl_x]_5$ ($0.71 \leq x \leq 0.79$).

Further features of the present invention will become apparent from the following description of exemplary embodiments with reference to the attached drawings.

DESCRIPTION OF THE EMBODIMENTS

First Embodiment

Figure 1:
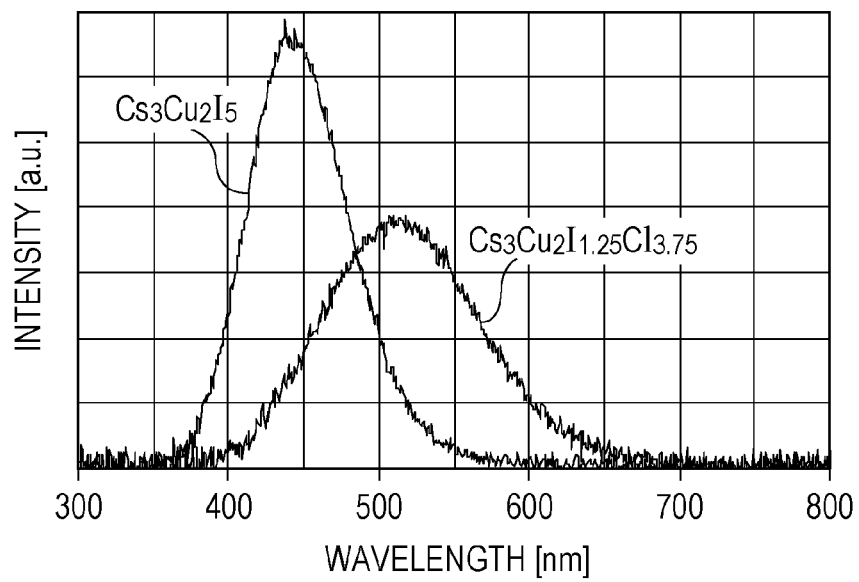
FIG. 1 illustrates X-ray-excited emission spectra of a compound according to a second embodiment.

In this embodiment, a compound represented by the general formula $Cs_3Cu_2[I_{1-x}Cl_x]_5$ will be described. In the compound, the value of x representing the proportion of Cl with respect to the sum of I and Cl, which are halogen elements, is 0.71 or more and 0.79 or less, i.e., $0.71 \leq x \leq 0.79$. To begin with, the range of the proportion x will be described.

$Cs_3Cu_2I_5$ corresponds to a compound represented by the foregoing general formula when the proportion x=0. $Cs_3Cu_2Cl_5$ corresponds to a compound represented by the foregoing general formula when the proportion x=1. They are known materials and have substantially the same crystal structure. However, $Cs_3Cu_2[I_{1-x}Cl_x]_5$ ($0<x<1$) is not yet studied or reported.

The inventors have found that when the range of x in the foregoing general formula satisfies 0.71 or more and 0.79 or less, i.e., $0.71 \leq x \leq 0.79$ is satisfied, a crystal transparent to visible light is obtained.

The crystal transparent to visible light has high transparency to visible light and only slightly scatters and absorbs visible light. Thus, when the crystal transparent to visible light (transparent crystal) is exposed to radiation to emit light, the crystal allows visible light to propagate therethrough to a photodetector with low optical propagation loss. Hence, the loss of the intensity of light received should be reduced. In the case of a radiation detector, the loss of the detection sensitivity should be reduced.

Crystal samples composed of compounds in which the values of x in the general formula $Cs_3Cu_2[I_{1-x}Cl_x]_5$ were 0.60, 0.71, 0.72, 0.73, 0.74, 0.75, 0.76, 0.79, and 0.80 were produced by a production method according to a second embodiment described below.

Table 1 describes the determination of whether the crystal samples corresponding to the values of x are transparent or opaque. Evaluation criteria to determine whether the crystal samples are transparent or opaque are described below. The transmittance of 550-nm-wavelength light passing through a 1-cm-thick crystal sample in which both surfaces are polished so as to be parallel to each other is measured. When the transmittance is 50% or more and less than 100%, the crystal sample is rated as being transparent. When the transmittance is more than 0% and less than 50%, is rated as being opaque. Table 1 clearly reveals that when the values of x representing the proportion of Cl with respect to the sum of I and Cl, which are halogen elements, are 0.60 and 0.80, the crystal samples are opaque and that when $0.71 \leq x \leq 0.79$, the crystal samples are transparent. Although not described in Table 1, it is known that a crystal in which the proportion x is 1.0 is chemically unstable in air and is often provided as an opaque crystal.

The foregoing results demonstrated that in the case where the compound is represented by the general formula $Cs_3Cu_2[I_{1-x}Cl_x]_5$ and where x is 0.71 or more and 0.79 or less, the compound, i.e., $Cs_3Cu_2[I_{1-x}Cl_x]_5$, is given as a transparent crystal.

TABLE 1

| Proportion x | Evaluation |
| --- | --- |
| 0.60 | opaque |
| 0.71 | transparent |

TABLE 1-continued

| Proportion x | Evaluation |
|---|---|
| 0.72 | transparent |
| 0.73 | transparent |
| 0.74 | transparent |
| 0.75 | transparent |
| 0.76 | transparent |
| 0.79 | transparent |
| 0.80 | opaque |

Second Embodiment

In this embodiment, a compound represented by the general formula $Cs_3Cu_2[I_{1-x}Cl_x]_5$, wherein x represents 0.75, and a method for producing a scintillator including the compound will be exemplified.

Powder materials of 25 mol % of cesium iodide (CsI), 35 mol % of cesium chloride (CsCl), and 40 mol % of copper chloride (CuCl) were weighed and mixed together to provide a total of 10 g of a powder mixture to be formed into $Cs_3Cu_2[I_{1.25}Cl_{3.75}]$ (x=0.75).

Figure 3:
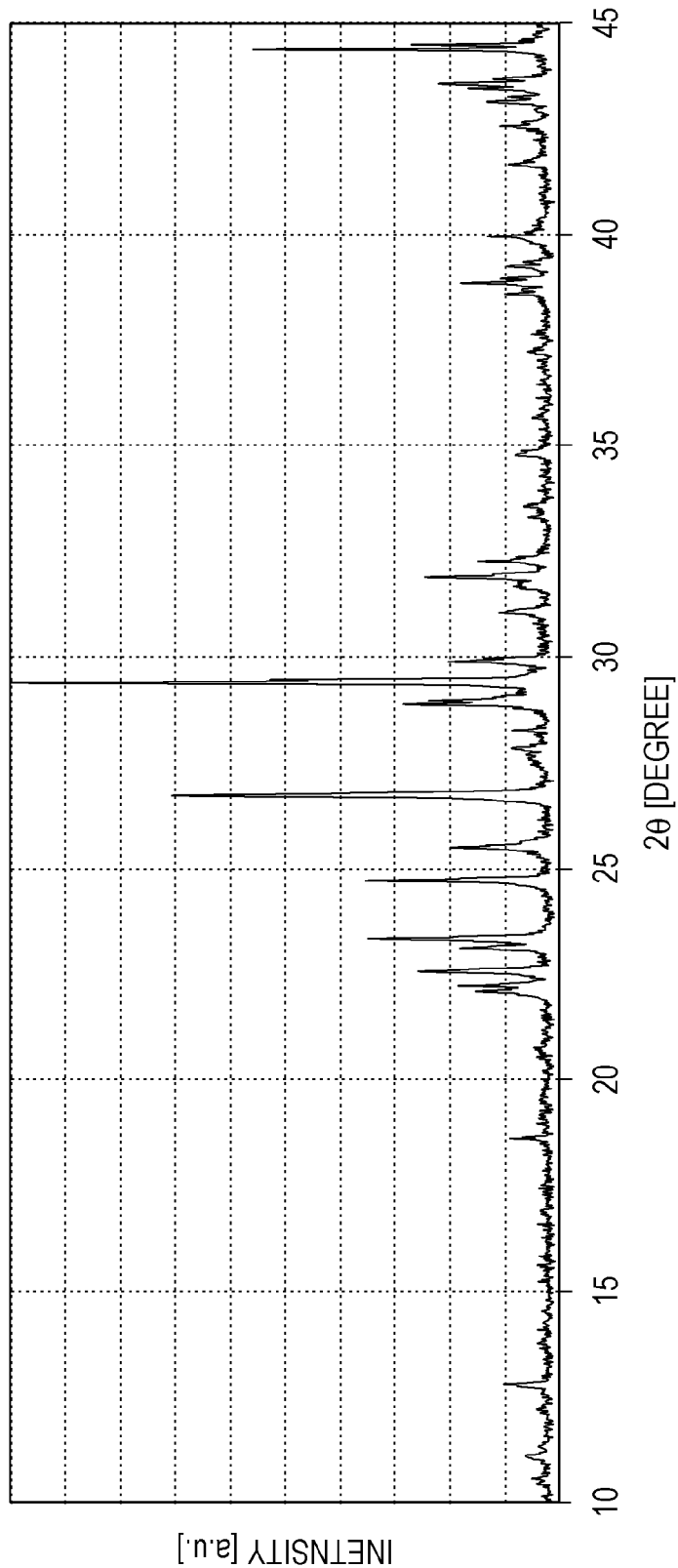
FIG. 3 illustrates a powder X-ray diffraction pattern of a compound according to a first embodiment of the present invention.

The powder mixture was sealed in the silica tube under vacuum and then melted at 600° C. for 30 minutes to form a molten material. The temperature was lowered from 600° C. to room temperature at 20° C. per hour with a temperature gradient created along the silica tube, thereby forming a solid product composed of a compound represented by $Cs_3Cu_2[I_{1.25}Cl_{3.75}]$ (x=0.75). The solid product was taken from the silica tube. The resulting transparent solid product (sample) was subjected to optical microscopic observation and powder X-ray diffraction (FIG. 3). The emission spectrum (FIG. 1) of the resulting solid product under X-ray excitation was measured.

A specific method for measuring an emission spectrum under X-ray excitation will be described below. A sample was cut into a plate having an area of about 50 mm² and a thickness of about 2 mm. After surfaces of the plate were polished, the area of the plate surfaces was measured. Here, the thickness is sufficient to absorb all X-rays incident on the sample. With respect to a method for determining the area of the plate surfaces, the entire plate surfaces are captured as images. The image data was subjected to treatment for the detection of edges of the plate surfaces and treatment for the calculation of the area of regions surrounded by the edges, thereby determining the value of the area of the plate surfaces. The plate-like sample having the polished surfaces can be used as a scintillator. Subsequently, the plate sample was placed in an integrating sphere. The entire surfaces of the plate-like sample were irradiated with X-rays, thereby emitting light. The light in the sphere was guided to a spectroscope arranged outside the sphere through optical fibers to obtain the dependence of the emission intensity on wavelength. Note that the whole of an optical measurement system including the integrating sphere and the spectroscope was calibrated. The values of the emission intensity in the resulting dependence of the emission intensity on wavelength were divided by the value of the area of the plate surfaces to ultimately obtain an emission spectrum. The data of the emission spectrum obtained here can be used to compare the intensities of different plate-like samples as long as the same X-ray irradiation conditions and the same measurement system were used. Regarding the X-ray irradiation conditions in this embodiment, an X-ray tube including an anode target composed of tungsten was used. A tube voltage of 60 kVp and a tube current of 1 mA were applied thereto. The distance between the X-ray tube and the sample was about 20 cm. A 3-mm-thick aluminum plate was arranged at the port of the integrating sphere into which X-rays were introduced.

FIG. 1 illustrates emission spectra of the sample according to this embodiment and a $Cs_3Cu_2I_5$ mixed crystal under X-ray excitation. FIG. 1 reveals that the emission spectrum of the sample according to this embodiment lies at longer wavelengths than that of the $Cs_3Cu_2I_5$ mixed crystal and is broader than that of the $Cs_3Cu_2I_5$ mixed crystal. The effect of the emission spectrum different from that of the $Cs_3Cu_2I_5$ mixed crystal on the intensity of light received will be described in a third embodiment.

Optical microscopic observation demonstrated that the resulting transparent sample was an optically uniform crystal that did not have an optical interface or a microstructure inside the sample.

The resulting sample was powdered and then subjected to powder X-ray diffraction. FIG. 3 illustrates a powder X-ray diffraction pattern of the powdered sample. Here, the wavelength of X-rays used was 1.54 Å. This figure reveals that the powder X-ray diffraction pattern of the crystal according to this embodiment is characterized by exhibiting a large number of diffraction peaks and exhibiting particularly strong diffraction peaks at diffraction angles 2θ of 27°, 29°, and 44°. This figure also reveals that the powder X-ray diffraction pattern exhibits weak diffraction peaks at diffraction angles 2θ of about 13° and about 19° in a low diffraction angle region.

Similarly, powder X-ray diffraction patterns of compounds in which x is 0.71 or more and 0.79 or less are substantially matched to that illustrated in FIG. 3 and exhibit diffraction peaks at the foregoing five diffraction angles.

In this embodiment, each of the powder X-ray diffraction patterns of the compounds may exhibit diffraction peaks at the five diffraction angles. When each of the diffraction peaks is observed at a diffraction angle within ±1° of a corresponding one of the diffraction angles, the compound is believed to have a crystal structure similar to that of the compound according to this embodiment.

Next, in air, the stability of the sample according to this embodiment was studied. Specifically, the sample was allowed to stand in air for two months. Changes in the shape and emission intensity of the sample before and after the standing were studied. The results demonstrated that the shape of the sample was negligibly changed and that no significant change in emission intensity with time was observed. This reveals that the scintillator formed of the sample according to this embodiment has low deliquescence. The term "low deliquescence" indicates a property in which the sample is not easily dissolved in water vapor in air.

Examples of a production method other than the method described above include methods for depositing scintillators on substrates by the vapor-phase transport of raw materials, for example, sputtering methods, thermal vapor deposition methods, electron-beam (EB) vapor deposition methods, and closed space sublimation techniques.

The scintillator including a compound represented by $Cs_3Cu_2[I_{1-x}Cl_x]_5$, wherein x is 0.71 or more and 0.79 or less, is not limited to a scintillator having a uniform composition. For example, in the case where a mixed structure of $Cs_3Cu_2[I_{1.45}Cl_{3.55}]$ and $Cs_3Cu_2[I_{1.25}Cl_{3.75}]$ is used as a scintillator, this scintillator is also referred to as a scintillator including a compound represented by $Cs_3Cu_2[I_{1-x}Cl_x]_5$, wherein x is 0.71 or more and 0.79 or less. Hereinafter, a structure including a compound represented by $Cs_3Cu_2[I_{1-x}Cl_x]_5$, wherein x is 0.71 or more and 0.79 or less, may be referred to as a structure represented by $Cs_3Cu_2[I_{1-x}Cl_x]_5$, wherein x is 0.71 or more and 0.79 or less.

Third Embodiment

This embodiment states that when light is emitted from a compound under X-ray excitation, the compound according to the second embodiment exhibits a high intensity of the light received on a photoelectric conversion element (intensity of light received), compared with the $Cs_3Cu_2I_5$ mixed crystal.

In this specification, the intensity of light received indicates a value obtained by finding the product of the emission spectrum and the sensitivity curve of the photoelectric conversion element for each wavelength and adding these products.

First, the emission spectrum will be described below. As described in the second embodiment, FIG. 1 illustrates the emission spectra of $Cs_3Cu_2[I_{1.25}Cl_{3.75}]$ (x=0.75) and the $Cs_3Cu_2I_5$ mixed crystal under X-ray excitation. Here, these emission spectra are normalized to the cross-sectional area of each sample. It is thus possible to compare the emission intensity of the foregoing compound with that of the mixed crystal for each wavelength. The emission spectrum of the $Cs_3Cu_2I_5$ mixed crystal exhibits a maximum value at a wavelength of about 440 nm and a full width at half maximum of about 70 nm. Meanwhile, the emission spectrum of $Cs_3Cu_2[I_{1.25}Cl_{3.75}]$ exhibits a maximum value at a wavelength of about 512 nm and a full width at half maximum of about 130 nm. Thus, the emission spectrum is a broad spectrum extending to longer wavelengths.

Figure 2:
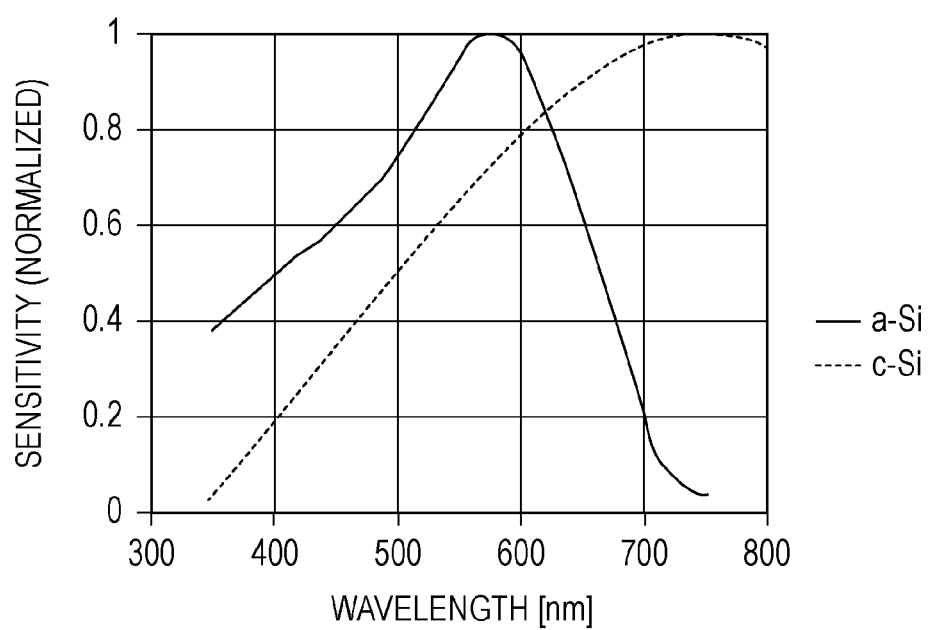
FIG. 2 illustrates light sensitivity curves of photoelectric conversion elements composed of a-Si and c-Si.

Next, the sensitivity curve of the photoelectric conversion element will be described below. FIG. 2 illustrates light sensitivity curves of photoelectric conversion elements composed of a-Si and c-Si. FIG. 2 reveals that for a-Si, a high light sensitivity region is located at a wavelength of about 560 nm and that for c-Si, a high light sensitivity region is located at a longer wavelength of about 750 nm, which is located in longer wavelengths.

The sum total of the product of each of the emission spectra and the sensitivity curve of a corresponding one of the photoelectric conversion elements was determined to find the intensities of light received from $Cs_3Cu_2I_5$ and $Cs_3Cu_2[I_{1.25}Cl_{3.75}]$. Table 2 describes the ratio of the intensity of light received from $Cs_3Cu_2[I_{1.25}Cl_{3.75}]$ to the intensity of light received from $Cs_3Cu_2I_5$. Here, the ratio is determined for each of the photoelectric conversion elements composed of a-Si and c-Si. Table 2 reveals that when the photoelectric conversion element composed of a-Si and $Cs_3Cu_2[I_{1.25}Cl_{3.75}]$ are used, the ratio of the intensity of light received is 1.15 and that when the photoelectric conversion element composed of c-Si and $Cs_3Cu_2[I_{1.25}Cl_{3.75}]$, the ratio of the intensity of light received is 1.37. That is, no matter which photoelectric conversion element is used, the intensity of light received from $Cs_3Cu_2[I_{1.25}Cl_{3.75}]$ is higher than that from the $Cs_3Cu_2I_5$ mixed crystal.

TABLE 2

| photoelectric conversion element | Ratio of intensity of light received (with respect to $Cs_3Cu_2I_5$) | |
|---|---|---|
| | Related art ($Cs_3Cu_2I_5$) | Present invention ($Cs_3Cu_2[I_{1.25}Cl_{3.75}]$) |
| a-Si | 1.00 | 1.15 |
| c-Si | 1.00 | 1.37 |

Although not illustrated in FIG. 1, emission spectra of other compounds in which x is 0.71 or more and 0.79 or less were matched or similar to the emission spectrum of $Cs_3Cu_2[I_{1.25}Cl_{3.75}]$ (x=0.75). Thus, as with the ratio of the intensity of light received from $Cs_3Cu_2[I_{1.25}Cl_{3.75}]$ described in Table 2, the ratios of the intensities of light received from the compounds which are represented by $Cs_3Cu_2[I_{1-x}Cl_x]_5$, wherein x is 0.71 or more and 0.79 or less, are more than 1 (for the photoelectric conversion elements composed of a-Si and c-Si).

That is, when a structure having a composition represented by the general formula $Cs_3Cu_2[I_{1-x}Cl_x]_5$, wherein x is 0.71 or more and 0.79 or less, emits light, the structure exhibits a high intensity of light received on a photoelectric conversion element composed of a-Si or c-Si, compared with $Cs_3Cu_2I_5$. This demonstrates that the incorporation of a compound having a composition represented by the general formula $Cs_3Cu_2[I_{1-x}Cl_x]_5$ (wherein $0.71 \leq x \leq 0.79$) results in a scintillator that exhibits a higher intensity of light received on a photoelectric conversion element.

The compound represented by the general formula $Cs_3Cu_2[I_{1-x}Cl_x]_5$ (wherein $0.71 \leq x \leq 0.79$) may be contained in an amount of 90% by weight or more and 100% by weight or less with respect to the total weight of a scintillator. A scintillator may be composed of the foregoing compound alone. Among those compounds represented by the general formula $Cs_3Cu_2[I_{1-x}Cl_x]_5$ (wherein $0.71 \leq x \leq 0.79$), a plurality of compounds having different compositions may be mixed together. In this case, the total amount of the compounds represented by the general formula $Cs_3Cu_2[I_{1-x}Cl_x]_5$ (wherein $0.71 \leq x \leq 0.79$) may be 90% by weight or more and 100% by weight or less with respect to the total weight of the scintillator. For example, in the case where a structure in which $Cs_3Cu_2[I_{1.45}Cl_{3.55}]$ and $Cs_3Cu_2[I_{1.25}Cl_{3.75}]$ are mixed together is used as a scintillator, the total amount of $Cs_3Cu_2[I_{1.45}Cl_{3.55}]$ and $Cs_3Cu_2[I_{1.25}Cl_{3.75}]$ may be 90% by weight or more and 100% by weight or less with respect to the total weight of the scintillator. However, the scintillator may contain an impurity or may be composed of a mixture containing a plurality of other compounds, as long as the effect of the present invention is not impaired. Furthermore, a structure or compound represented by the general formula $Cs_3Cu_2[I_{1-x}Cl_x]_5$ (wherein $0.71 \leq x \leq 0.79$) may be used for applications other than scintillators.

Fourth Embodiment

In this embodiment, an exemplary radiation detector in which the compound according to the first embodiment is used as a scintillator will be described.

Figure 4:
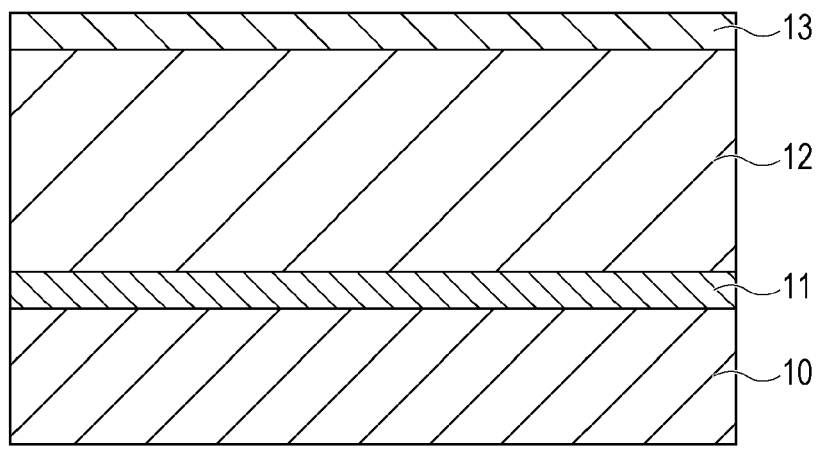
FIG. 4 illustrates the structure of a radiation detector according to a third embodiment of the present invention.

FIG. 4 illustrates the structure of a radiation detector. The radiation detector illustrated in FIG. 4 includes a substrate 10, an photodetector layer 11 including a photoelectric conversion element array, a scintillator layer 12, and a protective layer 13 arranged in that order. Here, a protective layer configured to prevent the degradation of a material constituting the scintillator and a light-guiding layer configured to control and guide scintillation light may be arranged between the photodetector layer 11 and the scintillator layer 12. Furthermore, an adhesive layer configured to bond the photodetector layer 11 and the scintillator layer 12 may be stacked. Here, an optical material layer configured to reflect, scatter, or absorb scintillation light may be arranged on a surface of the protective layer 13 opposite the surface in contact with the scintillator layer 12.

When a radiation is incident on the radiation detector according to this embodiment, the scintillator layer 12 absorbs the radiation and emits light corresponding to the emission spectrum illustrated in FIG. 1. The emitted light may be directly incident on the photodetector layer 11. Alternatively, for example, the emitted light may be reflected or scattered from the interface between the scintillator layer 12 and the protective layer 13 or inside the protective layer 13, and then the light may be incident on the photodetector layer 11. The photodetector layer 11 partially or completely absorbs the incident light, depending on its sensitivity, and converts the light into a charge signal. The radiation can be detected through these steps.

The compound described in the first embodiment may be used as a material for the scintillator layer 12 according to this embodiment.

Fifth Embodiment

In this embodiment, an exemplary method for producing the radiation detector according to the fourth embodiment will be described below.

The structure according to the first embodiment is processed into a plate. Surfaces of the plate are polished to produce a scintillator layer (with a thickness of 300 μm). The scintillator layer is bonded to a light-receiving surface of a CCD detector with a double-faced adhesive sheet into one piece, the CCD detector including the substrate 10 integral with the photodetector layer 11 having a photoelectric conversion element array composed of a-Si. Furthermore, an aluminum reflective film is bonded onto the scintillator layer with a double-faced adhesive protective sheet to produce the radiation detector illustrated in FIG. 4. When X-rays are incident on the radiation detector through an X-ray chart and then image data is extracted from the radiation detector, light and dark lines reflecting the shape of the X-ray chart can be observed in the image.

This demonstrates the effectiveness of the fourth embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-128997 filed Jun. 6, 2012, which is hereby incorporated by reference herein in its entirety.

What is claimed is:

1. A compound represented by the general formula $Cs_3Cu_2[I_{1-x}Cl_x]_5$, wherein x is 0.71 or more and 0.79 or less.

2. A structure comprising:
the compound according to claim 1.

3. A scintillator comprising:
the compound according to claim 1.

4. The scintillator according to claim 3,
wherein the compound is contained in an amount of 90% by weight or more and 100% by weight or less with respect to the total weight of the scintillator.

5. A radiation detector comprising:
the scintillator according to claim 4; and
a photodetector layer configured to detect light from the scintillator.

6. The radiation detector according to claim 5,
wherein the photodetector layer includes a photoelectric conversion element composed of a-Si or c-Si.

7. A radiation detector comprising:
the scintillator according to claim 3; and
a photodetector layer configured to detect light from the scintillator.

8. The radiation detector according to claim 7,
wherein the photodetector layer includes a photoelectric conversion element composed of a-Si or c-Si.

9. A method for producing a compound, comprising:
mixing cesium iodide, cesium chloride, and copper chloride together in such a manner that the molar ratio of cesium to copper to iodine to chlorine is 3:2:5(1-x):5x (wherein $0.71 \leq x \leq 0.79$);
melting the resulting mixture; and
solidifying the resulting molten material to give a compound.

10. The method according to claim 9,
wherein the compound is represented by the general formula $Cs_3Cu_2[I_{1-x}Cl_x]_5$ (wherein $0.71 \leq x \leq 0.79$).

11. A method for producing a scintillator, comprising:
cutting a compound produced by the method into a plate-like piece according to claim 9.

12. A method for producing a radiation detector, comprising:
integrating a photodetector layer with a scintillator produced by the method according to claim 11.

* * * * *